(12) United States Patent
Mihara et al.

(10) Patent No.: US 8,681,187 B2
(45) Date of Patent: Mar. 25, 2014

(54) IMAGE PROCESSING APPARATUS, NON-TRANSITORY STORAGE MEDIUM STORING IMAGE PROCESSING PROGRAM AND IMAGE PROCESSING METHOD

(75) Inventors: Motonobu Mihara, Kawasaki (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 608 days.

(21) Appl. No.: 12/954,097

(22) Filed: Nov. 24, 2010

(65) Prior Publication Data

US 2011/0128296 A1   Jun. 2, 2011

(30) Foreign Application Priority Data

Nov. 30, 2009  (JP) ................. 2009-272829

(51) Int. Cl.
*G09G 5/00* (2006.01)
*G09G 5/10* (2006.01)
*H04N 5/228* (2006.01)
*A61B 1/06* (2006.01)
*H04N 9/68* (2006.01)
*H04N 5/238* (2006.01)
*H04N 5/57* (2006.01)
*H04N 1/40* (2006.01)
*H04N 1/46* (2006.01)
*G06K 9/40* (2006.01)
*G06K 9/36* (2006.01)

(52) U.S. Cl.
USPC ........... 345/690; 345/207; 345/606; 345/617; 345/643; 348/68; 348/222.1; 348/235; 348/365; 348/687; 358/461; 358/509; 382/263; 382/274; 382/276

(58) Field of Classification Search
USPC ......... 345/581, 428, 589, 606, 612, 617–618, 345/643, 204, 207, 690; 348/68–70, 222.1, 348/223.1, 227.1, 235–236, 238, 251, 254, 348/365–366, 370, 396.1, 437.1, 438.1, 348/578, 602, 615, 687, 707, 711–712; 358/509–510, 514, 516, 520, 525, 448, 358/461; 382/254, 260, 263, 264, 273, 274, 382/276, 300, 312; 307/202
See application file for complete search history.

(56) References Cited

U.S. PATENT DOCUMENTS 7,057,653 B1 * 6/2006 Kubo ............................ 348/273
7,545,397 B2   6/2009 O'Dea et al.
(Continued)

FOREIGN PATENT DOCUMENTS

JP   2003-280598 A   10/2003
JP   2006-121713 A   5/2006
(Continued)

OTHER PUBLICATIONS

Japanese Office Action mailed Sep. 10, 2013 for corresponding Japanese Application No. 2009-272829, with Partial English-language Translation.

*Primary Examiner* — Wesner Sajous
(74) *Attorney, Agent, or Firm* — Fujitsu Patent Center

(57) ABSTRACT

An image processing apparatus includes a calculation to calculate a compression gain that is applied to a low-frequency component of an input image and an amplification gain that is applied to a high-frequency component of the input image, a generation to generate a display image in which a pixel value of a pixel of the input image is corrected based on the compression gain and the amplification gain calculated by the calculation unit, and a display to display the display image.

20 Claims, 18 Drawing Sheets

(56) References Cited

U.S. PATENT DOCUMENTS

| | | |
|---|---|---|
| 7,734,111 B2 | 6/2010 | Toyoda et al. |
| 2009/0295937 A1* | 12/2009 | Sato et al. .................. 348/222.1 |
| 2010/0290714 A1 | 11/2010 | Toyoda et al. |

FOREIGN PATENT DOCUMENTS

| | | |
|---|---|---|
| JP | 2006-285063 A | 10/2006 |
| JP | 2007-281767 A | 10/2007 |
| WO | WO-2009/107197 A1 | 9/2009 |

* cited by examiner

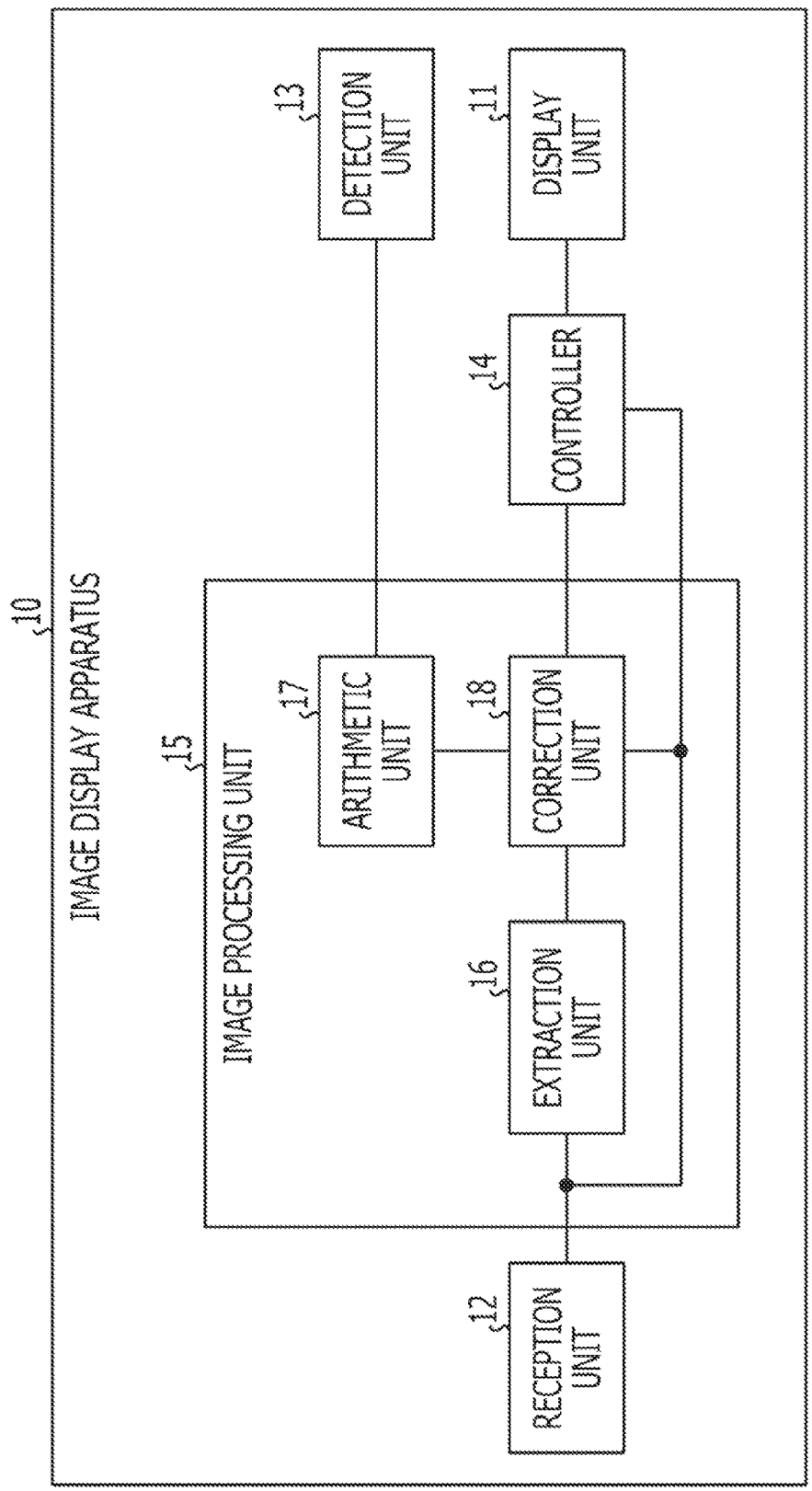

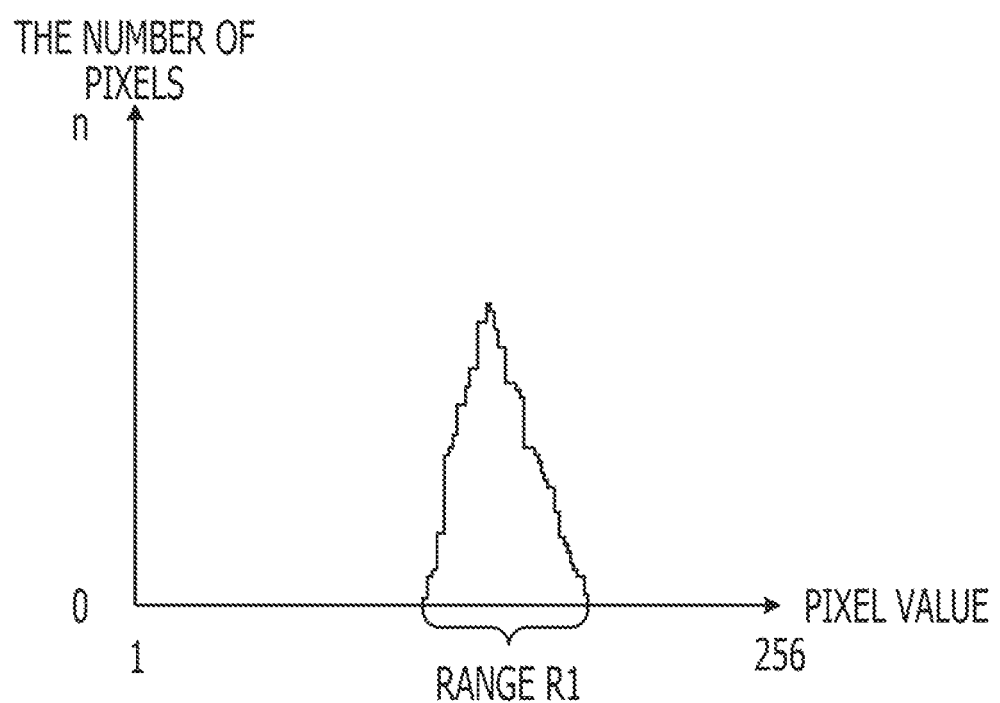

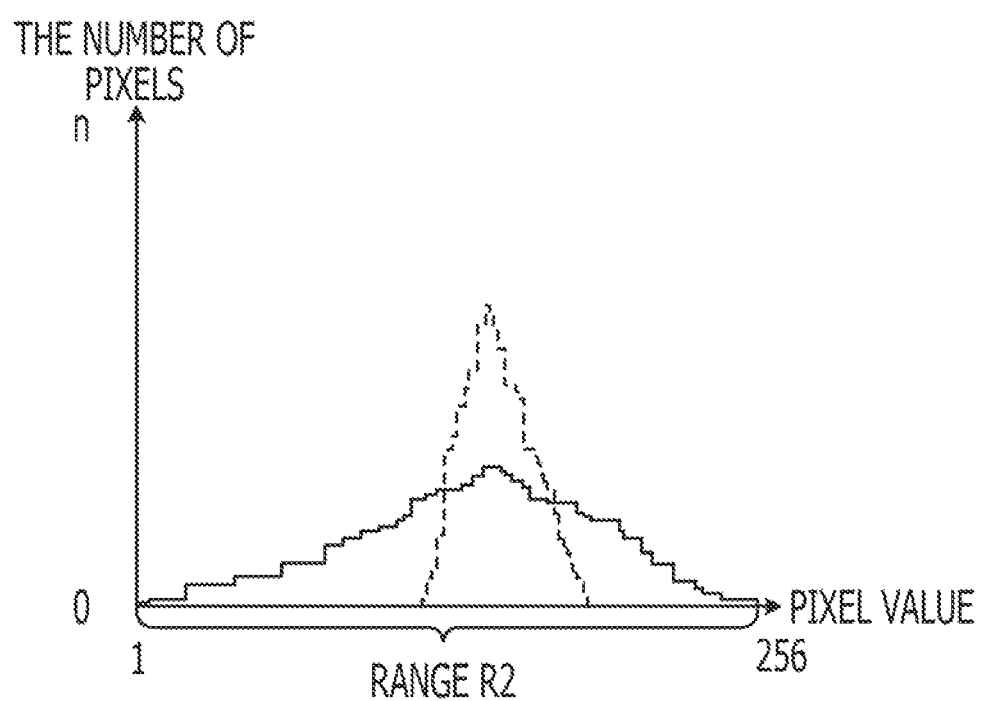

IMAGE PROCESSING APPARATUS, NON-TRANSITORY STORAGE MEDIUM STORING IMAGE PROCESSING PROGRAM AND IMAGE PROCESSING METHOD

CROSS-REFERENCE TO RELATED APPLICATIONS

This application is based upon and claims the benefit of priority of the prior Japanese Patent Application No. 2009-272829, filed on Nov. 30, 2009, the entire contents of which are incorporated herein by reference.

FIELD

The embodiments discussed herein relate to an image processing apparatus, a non-transitory storage medium that stores an image processing program, and image processing method thereof.

BACKGROUND

Conventionally, improving visibility of a display image on a display unit has been demanded. However, a display unit may not necessarily be in an environment that allows a viewer to easily see an image displayed on the display unit. For example, the brightness of external light penetrating into a display unit may affect the visibility of the display image.

That is, when the display unit is exposed to direct sunlight, visibility of a display image is lowered by sunlight reflected by the display unit. Particularly, when illuminance of sunlight is larger than an amount of light that reaches the viewer from the display unit, light that reaches the viewer from the display is dominated by the reflected sunlight more than gradation of the display image itself. Accordingly, when the display unit is exposed to direct sunlight, the display image that is output by the display unit becomes a white blurry image for the viewer. In other words, when light with high illuminance is irradiated to the display unit, the image the viewer sees is an image with a contrast lower than the contrast of the display image that is output on the display unit. As described above, losing difference of the gradation in the entire image leads to deterioration of the visibility.

Japanese Laid-open Patent Publication No. 2006-285063 discusses an image display apparatus that applies a tone correction and a saturation correction according to illuminance around a display unit. The tone correction refers to a correction that allocates more tone width to an area with a lower pixel value and allocates less tone width to an area with a higher pixel value in an input image. Hereinafter, the area with a lower pixel value in the input image is called a shadow part while the area with a higher pixel value in the input image is called a highlight part. The pixel value indicates a brightness and luminance of each pixel. For example, a pixel value is represented by a numerical value from 1 to 256. Meanwhile, the saturation correction increases color saturation so that similar colors can be easily distinguished. In other words, the saturation correction improves purity of a color.

SUMMARY

According to an aspect of the invention, an image processing apparatus includes a calculation unit to calculate a compression gain that is applied to a low-frequency component of an input image and an amplification gain that is applied to a high-frequency component of the input image, a generation unit to generate a display image in which a pixel value of a pixel of the input image is corrected based on the compression gain and the amplification gain calculated by the calculation unit, and a display unit to display the display image.

The object and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a functional block diagram of an image display apparatus according to a second embodiment;

FIG. 5A is a histogram illustrating distribution of pixel values in a first high-frequency component;

FIG. 5B is a histogram illustrating distribution of pixel values in a second high-frequency component;

DESCRIPTION OF EMBODIMENTS

The technology discussed in Japanese Laid-open Patent Publication No. 2006-285063 has its limit in improving visibility of a display image.

For example, the tone correction allocates a larger tone width to an area where pixel values are lower in an input image. In other words, a tone width that may be allocated to an area where the pixel values are higher in the image becomes smaller. Accordingly, many tones are allocated to a shadow part by sacrificing tones of a highlight part. Sacrificing tones allocated to the highlight part compresses a tone difference among pixels in the highlight part. As a result, the highlight part is saturated to be white. As described above, fine gradation difference in the original image is not reproduced in the display image and thereby visibility in the highlight part is degraded.

The saturation correction changes brightness. Hence, the saturation correction may not improve a light-shade contrast.

As described above, the saturation correction may not correct the highlight part in which visibility is degraded by the tone correction.

The inventors propose an image processing apparatus that enables improved visibility of a display image even when external light with a high illuminance is irradiated to the display unit, a non-transitory storage medium that stores an image processing program, and image processing method thereof.

Hereinafter, the image processing apparatus, the image display apparatus, the image processing program and the image processing method will be described in detail by referring to accompanying drawings. Note that the embodiment does not limit technologies disclosed herein. Each of the embodiments may be combined as appropriate in a range so as not to cause inconsistencies among processing contents.

First Embodiment

Figure 1:
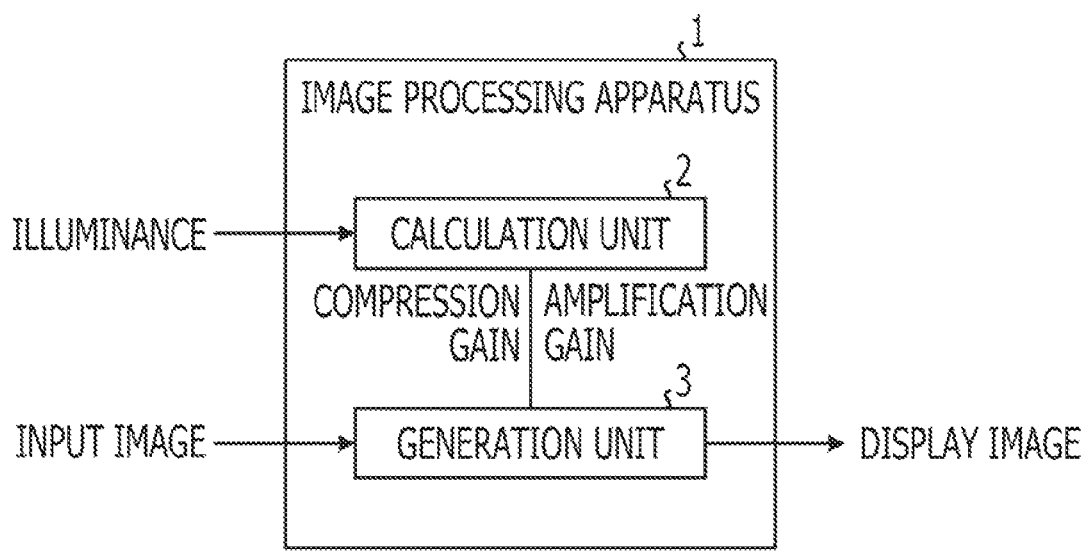
FIG. 1 is a functional block diagram of an image processing apparatus according to a first embodiment.

FIG. 1 is a block diagram illustrating a configuration of an image processing apparatus according to the first embodiment. As illustrated in FIG. 1, an image processing apparatus 1 includes a calculation unit 2 and a generation unit 3.

The calculation unit 2 calculates a compression gain and an amplification gain using an input illuminance. The compression gain is applied to an low-frequency component in an input image. The amplification gain is applied to a high-frequency component in the input image. The low-frequency component is where change of luminance in the input image is smaller than a specified value. Meanwhile, the high-frequency component is where change of luminance in the input image is larger than the specified value. The low-frequency component and high-frequency component are separated by conventional technologies such as a filtering. The specified value may be determined by a filter size, for example.

The generation unit 3 generates a display image to be output based on the compression gain and the amplification gain calculated by the calculation unit 2.

In other words, the generation unit 3 compresses a dynamic range of the low-frequency component. Moreover, the generation unit 3 amplifies the high-frequency component. The generation unit 3 generates a display image by composing the compressed low-frequency component and the amplified high-frequency component. The generation unit 3 may extend dynamic ranges of both a shadow part and a highlight part by compressing the low-frequency component. Moreover, the generation unit 3 may make a fine gradation difference in the input image conspicuous in both the shadow part and the highlight part by amplifying the high-frequency component. The low-frequency component is called an illumination component because the low-frequency component reflects illumination light under an environment in which the image is photographed. The high-frequency component is called a reflectance component because the high-frequency component reflects an edge of an object gradation information itself regardless of an environment in which the image is photographed.

Figure 2A:
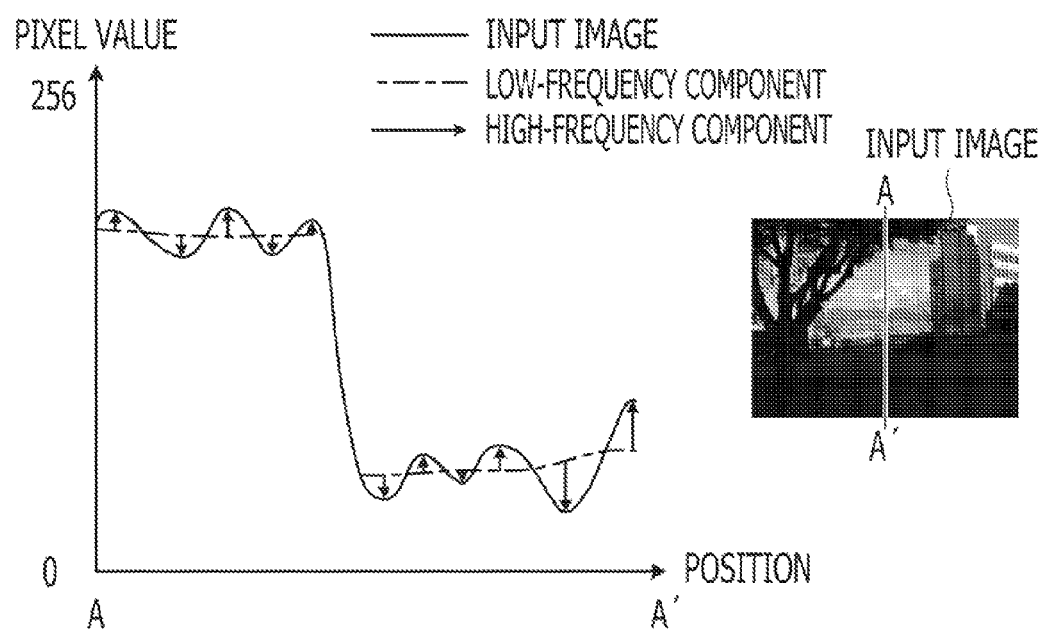
FIG. 2A illustrates pixel values of a low-frequency component and a high-frequency component along a line segment A-A' of an input image.
Figure 2B:
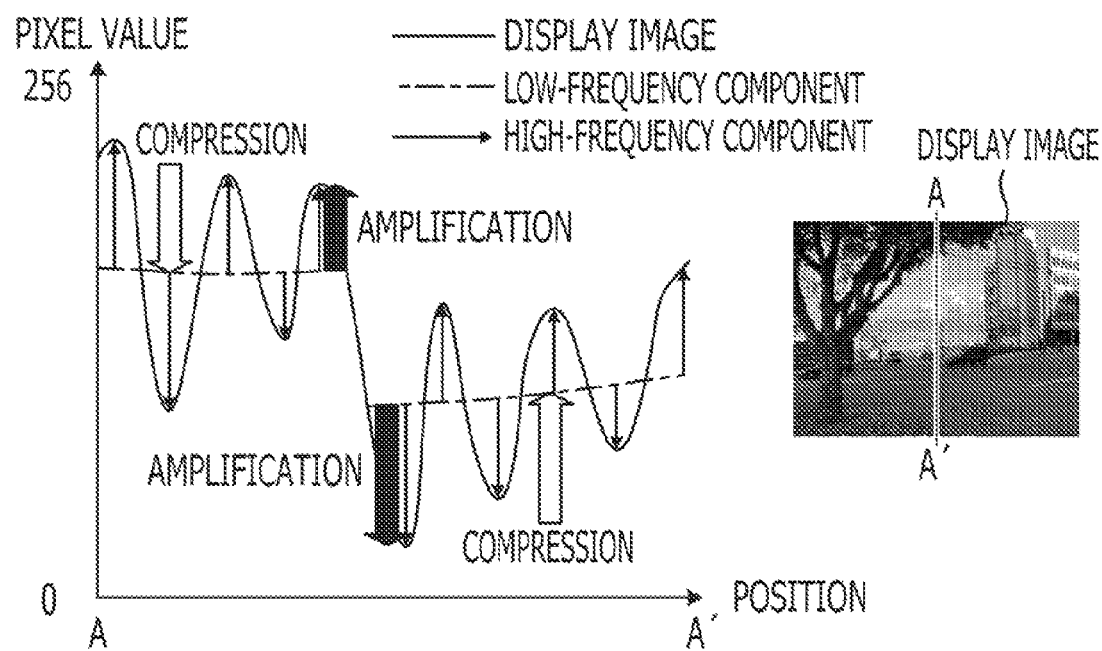
FIG. 2B illustrates pixel values of a low-frequency component and a high-frequency component along a line segment A-A' of a display image.

Generation of a display image comprising a plurality of pixels will be described by referring to FIGS. 2A and 2B. FIG. 2A illustrates pixel values of a low-frequency component and a high-frequency component along a line segment A-A' of an input image. FIG. 2B illustrates pixel values of a low-frequency component and a high-frequency component along a line segment A-A' of a display image. The image indicated on the right side of FIG. 2A is an input image. The image indicated on the right side of FIG. 2B is a display image. Moreover, a horizontal axis of a graph indicated on a left side of FIGS. 2A and 2B indicate positions of pixels from a line segment A to A' of each image. Moreover, a vertical axis of a graph indicated on a left side of FIGS. 2A and 2B indicate pixel values of each image.

As illustrated in FIGS. 2A and 2B, the generation unit 3 compresses a dynamic range of the low-frequency component in the input image up to a dynamic range of the low-frequency component in the display image according to the compression gain. Moreover, the generation unit 3 amplifies the high-frequency component in the input image to the high-frequency component in the display image according to the amplification gain.

As described above, the dynamic range of illumination component that correspond to the low-frequency component while amplifying the reflectance component that corresponds to the high-frequency component. Accordingly, the technology according to the embodiment may improve contrasts in a highlight part and a shadow part respectively. Furthermore, the technology according to the embodiment may generate an image that alleviates an influence of external light. The compression processing and the amplification processing change input image data. Thus, when an illuminance of external light irradiated to the generated display screen is low, the user may visually recognize the image as an image with an excessive contrast.

Thus, the calculation unit 2 uses the illuminance of external light irradiated to the display unit where the display image is output. In other words, the calculation unit 2 calculates a compression gain and an amplification gain based on the illuminance. For example, the calculation unit 2 increases the compression gain and the amplification gain as the illuminance becomes higher. Moreover, the calculation unit 2 decreases the compression gain and the amplification gain as the illuminance becomes lower.

Therefore, the generation unit 3 may achieve a control that suppresses an extension of the dynamic range and an emphasis of gradation of the original image when illuminance around the display unit is low. Moreover, the generation unit 3 may achieve a control that enhances an extension of the dynamic range and an emphasis of gradation of the original image when illuminance around the display unit is high.

As described above, the image processing apparatus 1 according to the embodiment may extend a dynamic range and emphasize gradation of the original image by following up an illuminance around the display unit. Hence, the image processing apparatus 1 may improve contrasts both in the shadow part and the highlight part. In other words, the image processing apparatus 1 may improve visibility of the display image even when external light with a high illuminance is irradiated to the display unit.

Second Embodiment

An image display apparatus according to a second embodiment will be described. FIG. 3 is a functional block diagram illustrating a configuration of an image display apparatus according to the second embodiment. As illustrated in FIG. 3, an image display apparatus 10 includes a display unit 11, a reception unit 12, a detection unit 13, a controller 14, and an image processing unit 15. The image display apparatus 10 may be applied for displaying both a still image and a moving image. The calculation unit 2 according to the above-described first embodiment corresponds to, for example, an arithmetic unit 17 illustrated in FIG. 3. Moreover, the generation unit 3 according to the above-described first embodiment corresponds to, for example, a correction unit 18 illustrated in FIG. 3.

The display unit 11 is a display device that displays various pieces of information. The various pieces of information are, for example, images that are supplied from a storage unit and an external apparatus, which are not illustrated. The display unit 11 is, for example, a monitor, a display, and a touch-panel.

The reception unit 12 is a processing unit for receiving an input image. For example, the reception unit 12 may receive an image taken by an imaging apparatus. In this case, the received image is an input image. The reception unit 12 may also download an image from an external apparatus that is coupled to the image display apparatus 10 via a network. In this case, the downloaded image is an input image. The reception unit 12 may further read an image stored in a storage unit or a portable storage medium such as a Compact Disk Read Only Memory (CD-ROM) and a Digital Versatile Disc (DVD). In this case, the read image is an input image. As described above, the reception unit 12 is achieved by optionally selecting means such as an imaging apparatus, a reading apparatus, or a communication interface.

The detection unit 13 is a processing unit for detecting an illuminance. For example, as the detection unit 13, an imaging apparatus such as a Charge Coupled Apparatus (CCD) and a Complementary Metal Oxide Semiconductor (CMOS), and an illuminance sensor that is configured by including a photo transistor and a photo diode may be used.

The detection unit 13 is preferably positioned where an illuminance of external light that is made incident on the display unit 11 may be detected. For example, when an imaging apparatus is used as the detection unit 13, the imaging apparatus is positioned so that an imaging range of the imaging apparatus is included in a specified area of a front face of the display unit 11. For example, the imaging apparatus is placed in a radius of 50 cm from the front of the screen of the display unit 11. Moreover, the imaging apparatus may be arranged so that the screen of the display unit 11 is included in the imaging range of the imaging apparatus. Furthermore, when an illuminance sensor is used as the detection unit 13, the illuminance sensor is preferably provided in the front part of the display unit 11.

The controller 14 is a processing unit for performing display control of the display unit 11. For example, the controller 14 displays a corrected image when visibility of an input image is corrected by processing, which will be described later. Moreover, when no correction is applied to an input image, the controller 14 outputs the input image that is received by the reception unit 12.

The image processing unit 15 is a processing unit for performing various imaging processing and may include the extraction unit 16, the arithmetic unit 17, and the correction unit 18.

Figure 4:
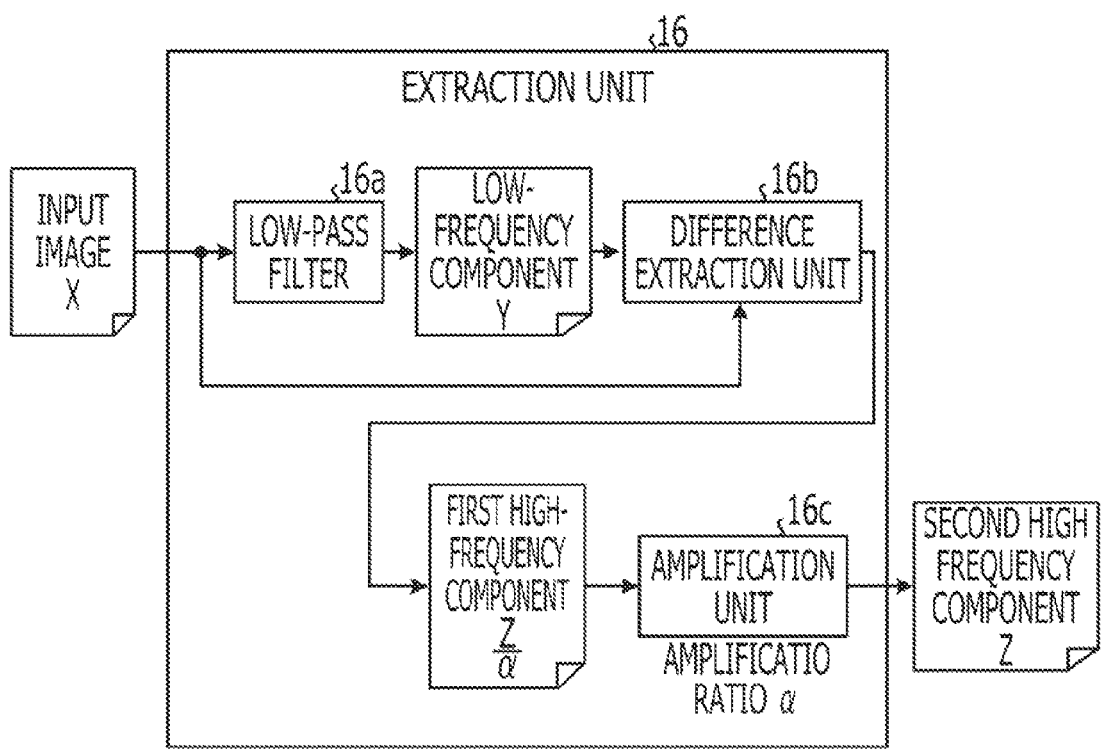
FIG. 4 illustrates an operation of an extraction unit.
Figure 6A:
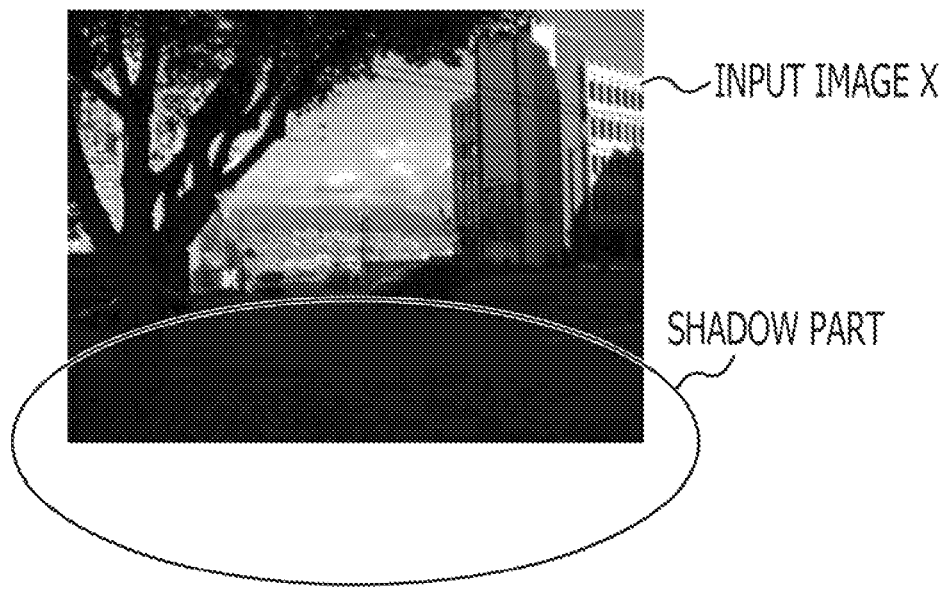
FIG. 6A is an exemplary input image.
Figure 6B:
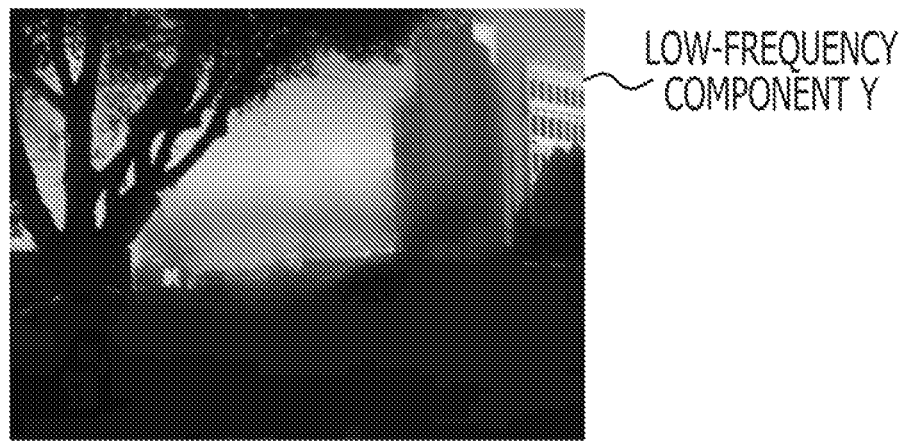
FIG. 6B illustrates a low-frequency component.
Figure 6C:
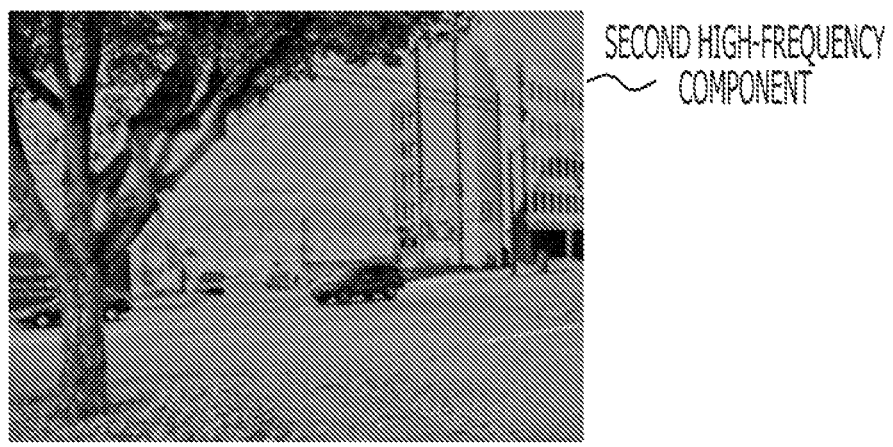
FIG. 6C is an exemplary high-frequency component after amplification.
Figure 6D:
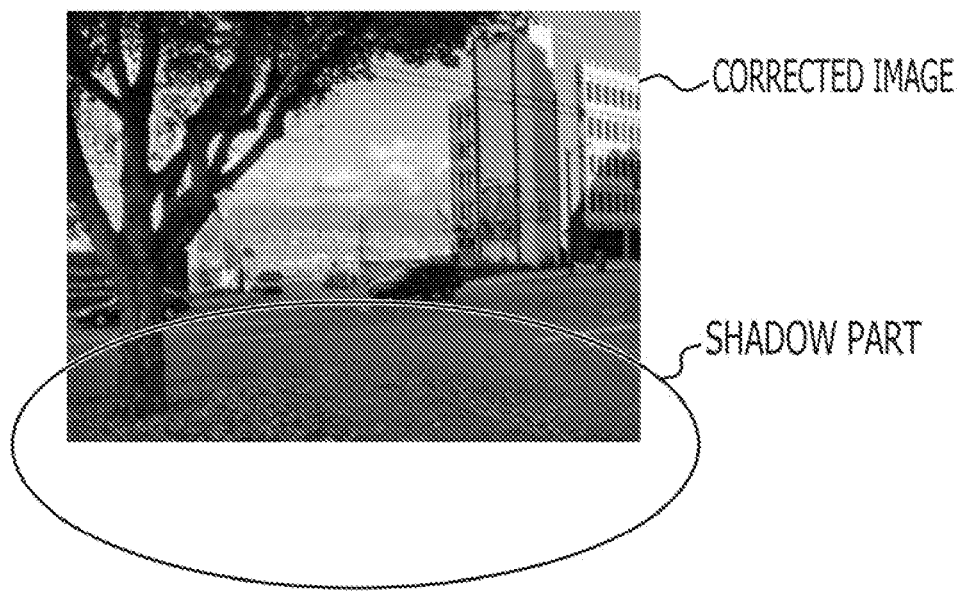
FIG. 6D is an exemplary corrected image.

The extraction unit 16 is a processing unit for extracting high-frequency component from an input image. The processing to extract the high-frequency component will be described by referring to FIGS. 4 to 6. FIG. 4 is a block diagram illustrating a configuration of the extraction unit 16. FIG. 5A is a histogram illustrating distribution of pixel values in a first high-frequency component. FIG. 5B is a histogram illustrating distribution of pixel values in a second high-frequency component. The horizontal axis of the graphs illustrated in FIGS. 5A and 5B indicate pixel values. The vertical axis of graphs illustrated in FIGS. 5A and 5B illustrates the number of pixels. In the graph of FIG. 5B, the histogram illustrated in FIG. 5A is illustrated as a dotted line. FIG. 6A is an exemplary input image. FIG. 6B illustrates a low-frequency component. FIG. 6C is an exemplary high-frequency component after amplification. FIG. 6D is an exemplary corrected image. The first high-frequency component and the second high-frequency component will be described later.

As illustrated in FIG. 4, the extraction unit 16 includes a low-pass filter 16*a*, a difference extraction unit 16*b*, and an amplification unit 16*c*.

The low-pass filter 16*a* performs convolution operations for pixel values of pixels that are subjects for computing in an input image X and pixel values of the surrounding pixels by using a filter table. In other words, the low-pass filter 16*a* is a filter circuit that calculates a pixel value of a low-frequency component Y. For example, the low-pass filter 16*a* calculates a low-frequency component Y illustrated in FIG. 6B from the input image X illustrated in FIG. 6A. As illustrated in FIG. 6B, the low-frequency component Y that is obtained by applying the low-pass filter 16*a* to the input image X becomes an image in which an entire object is blurry because pixel values of the input image X are smoothed. A low-pass filter of an edge preservation type may be used as the low-pass filter. Components separated by the edge-reservation type low-pass filter are illumination component and reflectance component. A bilateral filter, for example, may be used for the edge-preservation type low-pass filter. The size of the filter is preferably defined to be a third of the number of lines or columns of a short side of the input image. The low-pass filter may not be limited to the edge-preservation type low-pass filter but a general low-pass filter may be used instead.

The difference extraction unit 16*b* is a processing unit for extracting a difference between the input image X and the low-frequency component Y. For example, the difference extraction unit 16*b* subtracts, for pixels of the same coordinates, a pixel value of the low-frequency component Y from the pixel value of the input image X. The difference extraction unit 16*b* calculates the pixel value of the first high-frequency component through the processing. Hereinafter, a high-frequency component extracted by the difference extraction unit 16*b* is called a first high-frequency component. Moreover, a high-frequency component amplified by the amplification unit 16*c* in the latter stage is called a second high-frequency component.

The amplification unit 16*c* is a processing unit for amplifying the first high-frequency component. The first high-frequency component is a differential image between the input image X and the low-frequency component Y, and therefore, an amplitude of pixel values of the first high-frequency component is small for correction performed by the correction unit 18 in the latter stage.

Therefore, the amplification unit 16*c* amplifies a range of pixel values of the first high-frequency component by performing linear interpolation based on substantially maximum value and minimum value of pixel values in the first high-frequency component. For example, the amplification unit 16*c* performs linear interpolation for all pixels of the first high-frequency component by assuming substantially the minimum pixel value of the first high-frequency component as "1", while substantially the maximum pixel value as "256." In the examples illustrated in FIGS. 5A and 5B, performing linear interpolation for the pixel values of the first high-frequency component illustrated in FIG. 5A amplifies the range of pixel values of the first high-frequency component from the range R1 to the range R2. As described above, the amplification unit 16*c* performs tone correction of the first high-frequency component.

The amplification unit 16*c* calculates an amplification ratio "α." The amplification ratio "α" is a ratio of the range R1 for the range R2, in other words, a value obtained by dividing the range R2 by the range R1. The amplification unit 16*c* amplifies the first high-frequency component by using the amplification ratio "α." The amplified first high-frequency component is the second high-frequency component. The example of FIG. 6C illustrates that the second high-frequency component is obtained in which a difference of fine gradation in the input image X is emphasized by removing the low-frequency component Y and amplifying the first high-frequency component. The second high-frequency component illustrated in FIG. 6C is theoretically an image with substantially the best visibility.

Now, returning to the explanation of FIG. 3, the arithmetic unit 15 is a processing unit for computing a composite ratio "a" of the second high-frequency component and the input image X by using illuminance acquired from the detection unit 13. Although, the arithmetic unit 15 does not compute a composite ratio of the high-frequency component and the low-frequency component Y, the input image X includes the low-frequency component Y, and accordingly the computation here is substantially the same as when a composite ratio of the low-frequency component and the high-frequency is obtained. Note that the composite ratio "a" is assumed to be equal to or larger than 0 and equal to or less than 1.

In other words, the composite ratio of the second high-frequency component when the input image and the high-frequency component is composed is "a", thus the composite ratio of the input image X is "1-a." As illustrated in FIG. 4, the input image is X, the low-frequency component is Y, the first high-frequency component is $z/\alpha$, and the second high-frequency component is Z. Accordingly, the composite image of the input image and the second high-frequency component is "X(1-a)+aZ". Hereinafter, the composite image of the input image and the second high-frequency component is called a corrected image. Substituting "$X=Y+Z/\alpha$" to the input image X, and sorting out the expression results in "$Y(1-a)+Z/\alpha(\alpha a+1-a)$." Thus, computing the composite ratio "a" is substantially the same as computing (1-a) as a compression gain of the low-frequency component Y. Computing the composite ratio "a" is substantially the same as computing ($\alpha a+1-a$) as an amplification gain of the first high-frequency component $Z/\alpha$. Thus, in the arithmetic unit 15, computing a compression gain of the low-frequency component Y and computing the amplification gain of the first high frequency component $z/\alpha$ are substantially the same.

Computation processing of the composite ratio "$\alpha$" by the arithmetic unit 15 will be described. The arithmetic unit 15 computes the composite ratio "a" so that the ratio "a" becomes larger as the illuminance detected by the detection unit 13 becomes higher. For example, the arithmetic unit 15 retains a linear function in which a composite ratio "a" at 500 Lux is defined as 0, while that of the 100,000 Lux is defined as 0.8. The arithmetic unit 15 computes the composite ratio "a" by substituting the illuminance detected by the detection unit 13 in the linear function. The arithmetic unit 15 assumes influence on the display unit 11 by external light is minute when illuminance detected by the detection unit 13 is lower than a threshold, and does not compute the composite ratio "a." The threshold is, for example, 500 Lux. The computation of a composite ratio is not limited to the linear function as described above. For example, the composite ratio may be 0.8 at 100,000 Lux, 0.2 at 20,000 Lux, and 0 at 500 Lux. Additionally, the relationship of the values of the composite ratios between 0.8 and 0.2 and between 0.2 and 0 may be linear.

The correction unit 18 is a processing unit that performs correction in order to improve visibility of the input image X. In other words, the correction unit 18 composes the input image X and the second high-frequency component Z by using the composite ratio "a" that is computed by the arithmetic unit 15. The composition will be described. The correction unit 18 multiplies a pixel value of an input image by a composite ratio (1-a) of the input image for each of the pixels, and multiplies a pixel value of the second high-frequency component by the composite ratio "a" of the second high-frequency component. The correction unit 18 adds the value obtained by multiplying the pixel value of the input image by the composite ratio (1-a) and the value obtained by multiplying the pixel value of the second high-frequency component by the composite ratio "a." The result of the addition becomes a pixel value of the corrected image. The correction unit 18 may obtain the corrected image by applying computation to all pixels of the input image X and the second high-frequency component.

For example, in the example illustrated in FIG. 6D, a corrected image is obtained in which extending the dynamic range and emphasizing gradation of the original image are executed by following up illuminance around the display unit 11. Comparing the corrected image illustrated in FIG. 6D with the input image X illustrated in FIG. 6A reveals that, in the corrected image, the carriageway and the car that are black blurry in the shadow part of the input image X may be visually recognized clearly in FIG. 6D. Moreover, in the corrected image, knags and grains of the tree that are black blurry in the input image X on the left side of FIG. 6A may be visually recognized clearly in FIG. 6D.

Functions of the image processing unit 15 may be achieved by providing the functions to an information processing apparatus. Such information processing apparatus may be a fixed terminal such as a known personal computer and a work station, moreover, a car navigation system, a mobile phone, a Personal Handyphone System (PHS) terminal, or a personal digital assistance (PDA). In particular, when functions of the image processing unit 15 are provided to a mobile terminal, external light irradiated to the display unit is assumed to be changed significantly according to change of a place where the mobile terminal is used, and advantages of the invention may be expected to be more significant.

The reception unit 12, the controller 14, and the image processing unit 15 may be achieved by an integrated circuit or an electronic circuit. As the integrated circuit, for example, Application Specific Integrated Circuit (ASIC), and Field Programmable Gate Array (FPGA) may be applied. As the electronic circuit, for example, a Central Processing Unit (CPU) or Micro Processing Unit (MPU) may be applied.

[Processing Flow]

Figure 7:
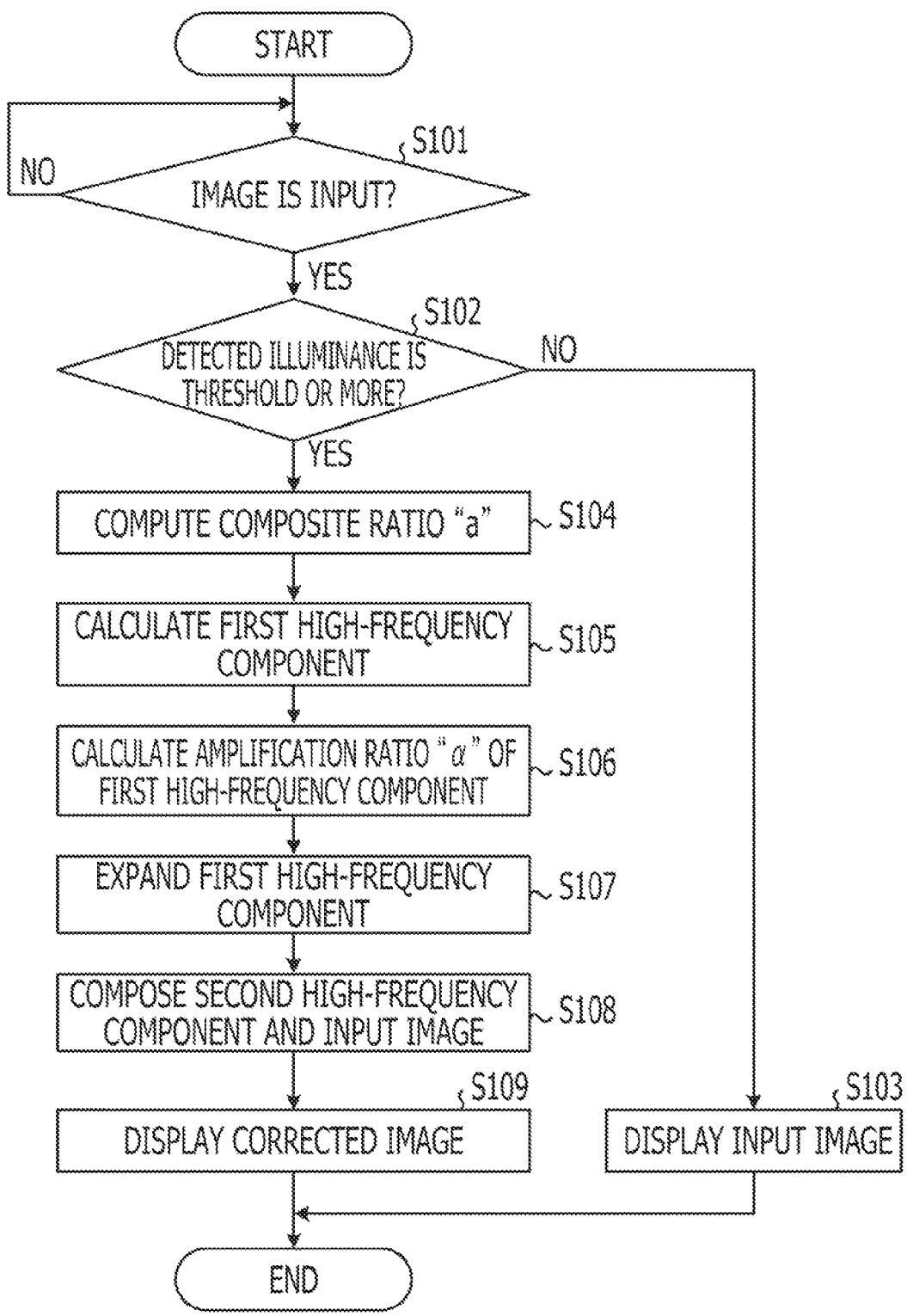
FIG. 7 is a flowchart illustrating processing procedures of the image display according to the second embodiment.

The processing flow of the image display apparatus according to the embodiment will be described. FIG. 7 is a flowchart illustrating processing procedures of the image display apparatus according to the second embodiment. The image display processing is started when the reception unit 12 receives an input image while the image processing apparatus is turned ON.

As illustrated in FIG. 7, when the reception unit 12 receives an input image (Operation S101: Yes), the arithmetic unit 15 determines illuminance detected by the detection unit 13 is a threshold or more (Operation S102).

When the illuminance is less than the threshold (Operation S102: No), the controller 14 displays the input image as it is on the display unit 11 (Operation S103), and completes the processing. This is because influence of the external light on the display unit 11 is minute and correction is unnecessary.

When the illuminance is threshold or more (Operation S102: Yes), the arithmetic unit 15 computes a composite ratio "a" of the second high-frequency component by using the illuminance acquired from the detection unit 13 (Operation S104).

The extraction unit 16 calculates a low-frequency component Y by applying the low-pass filter 16a to the input image X. The extraction unit 16 calculates the first high-frequency component by extracting a difference between the input image X and the low-frequency component Y (Operation S105).

The extraction unit 16 calculates an amplification ratio "α" by dividing a range of pixel values of the first high-frequency component after applying tone correction by a range of the pixel values of the first high-frequency component before applying the tone correction (Operation S106). The amplification unit 16c amplifies the first high-frequency component according to the amplification ratio "α" determined as described above (Operation S107). In other words, the amplification unit 16c generates the second high-frequency component.

The correction unit 18 composes the input image X and the second high-frequency component Z by using the composite ratio "a" that is computed by the arithmetic unit 15 (Operation S108). The controller 14 displays the image corrected by the correction unit 18 on the display unit 11 (Operation S109), and completes the processing.

In the flowchart of FIG. 7, the input image is displayed at Operation S103 when the illuminance is less than the threshold (Operation S102: No), however, the processing may be moved to the Operation S104. This is because the arithmetic unit 15 computes the composite ratio "a" as zero when the illuminance is less than the threshold, and thereby the input image is displayed.

In the flowchart of FIG. 7, the arithmetic unit 15 computes a composite ratio "a" whenever an input image is received. Alternatively, the image display apparatus 10 may calculate the composite ratio "a" whenever a specified number of input images are received. The calculated composite ratio "a" is applied to the certain number of input images that are subsequently received. Moreover, a composite ratio "a" may be calculated not by the number of input images but by a certain time interval.

The image display apparatus 10 according to the embodiment may extend the dynamic range and emphasize gradation of the original image by following up the illuminance around the display unit 11. Therefore, the image display apparatus 10 may improve contrasts both in the shadow part and the highlight part. According to the image display apparatus 10, even when external light with high illuminance is irradiated to the display unit 11, visibility of the display image may be improved.

Third Embodiment

In the above-described second embodiment, an example in which the image display apparatus 10 includes one detection unit, which is the detection unit 13, however, the detection unit is not necessarily one. Thus, according to the third embodiment, a case in which an image display apparatus 31 includes a plurality of detection units, a detection unit 31-1 and a detection unit 31-2 will be described.

Figure 8:
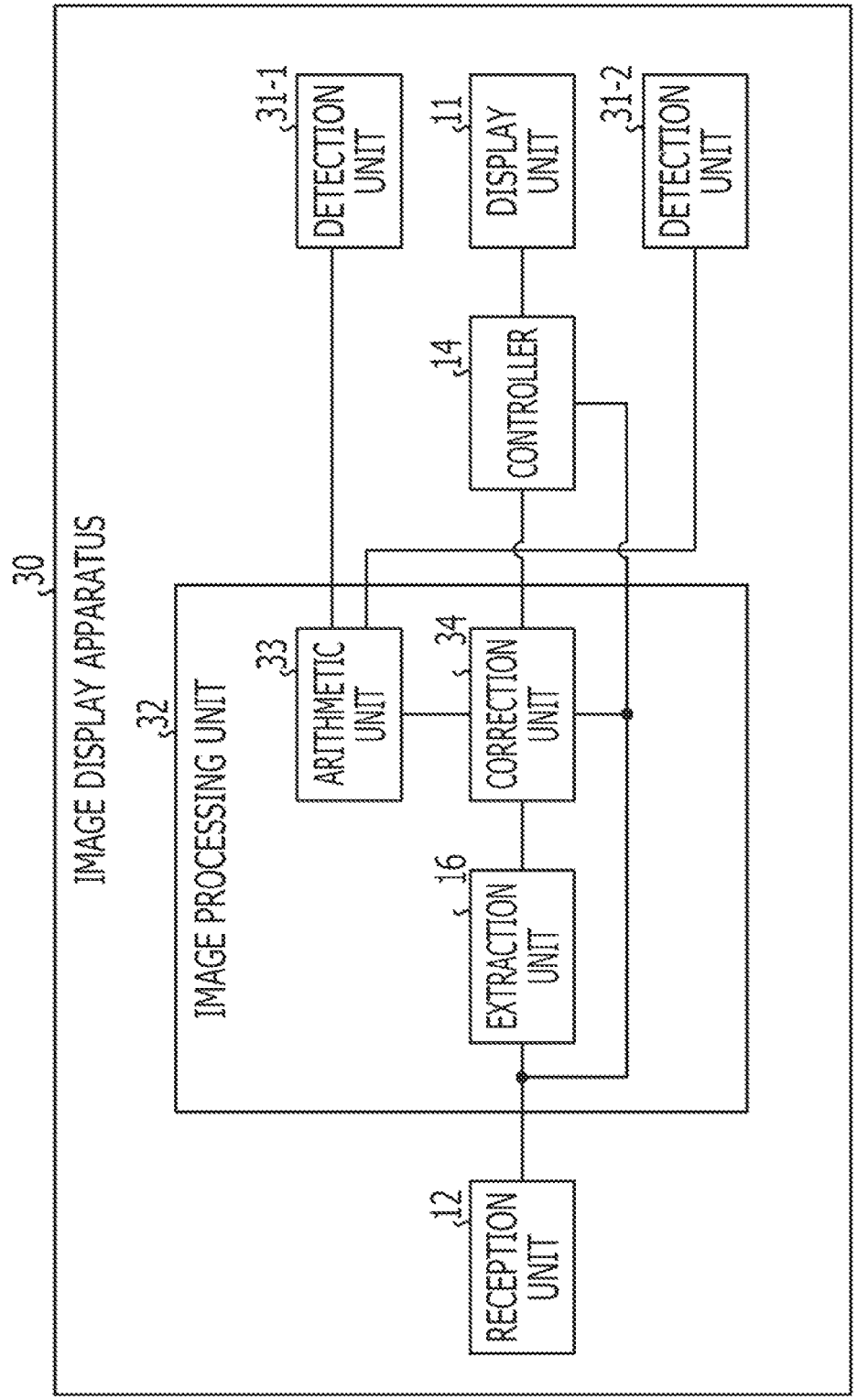
FIG. 8 is a functional block diagram of an image display apparatus according to a third embodiment.

FIG. 8 is a functional block diagram of an image display apparatus according to the third embodiment. As illustrated in FIG. 8, the image display apparatus 30 differs from the image display apparatus 10 illustrated in FIG. 3, in that the image display apparatus 30 includes a plurality of the detection units, the detection unit 31-1 and the detection unit 31-2. Moreover, as illustrated in FIG. 8, an image processing unit 32 includes an arithmetic unit 33 and a correction unit 34 the processing of which are partially different from those of the image display apparatus 10 illustrated in FIG. 3.

Figure 9:
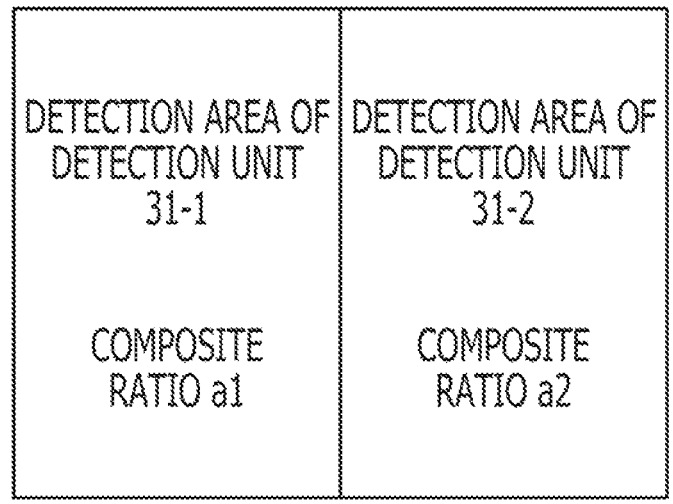
FIG. 9 is an example of detection areas of detection units.

An example of detection areas of the detection unit 31-1 and the detection unit 31-2 will be described. FIG. 9 is an example of detection areas of the detection unit 31-1 and the detection unit 31-2. In FIG. 9, the detection area of the detection unit 31-1 is a left side of the screen when the screen of the image display unit 11 is viewed from the front. Moreover, an area of the right side of the screen is a detection area of the detection unit 31-2. Although two detection units are illustrated in FIG. 9, the number of the detection units of the disclosed apparatus is not so limited. In other words, the disclosed apparatus may be applied for a case in which any number of detection units is provided. A case in which the detection area of the detection unit 31-1 is not overlapped with that of the detection unit 31-2 is described. However, a part of the detection area may be overlapped.

The arithmetic unit 33 computes a composite ratio "a" of the second high-frequency component by using illuminances obtained from the detection unit 31-1 and the detection unit 31-2. A case is described in which the arithmetic unit 17 illustrated in FIG. 3 uses substantially the same composite ratio "a" for all of the pixels. However, the arithmetic unit 33 in FIG. 8 may use different composite ratios for pixels.

The arithmetic unit 33 computes composite ratios for each of the detection areas of the detection unit 31-1 and the detection unit 31-2. The computation of the composite ratio for each detection area is substantially the same as the computation by the arithmetic unit 17 illustrated in FIG. 3, and thereby will not be described here. For example, as illustrated in FIG. 9, it is assumed that the arithmetic unit 33 computes "a1" as a composite ratio in the detection area of the detection unit 31-1, while the arithmetic unit 33 computes "a2" as a composite ratio in the detection area of the detection unit 31-2.

Figure 10:
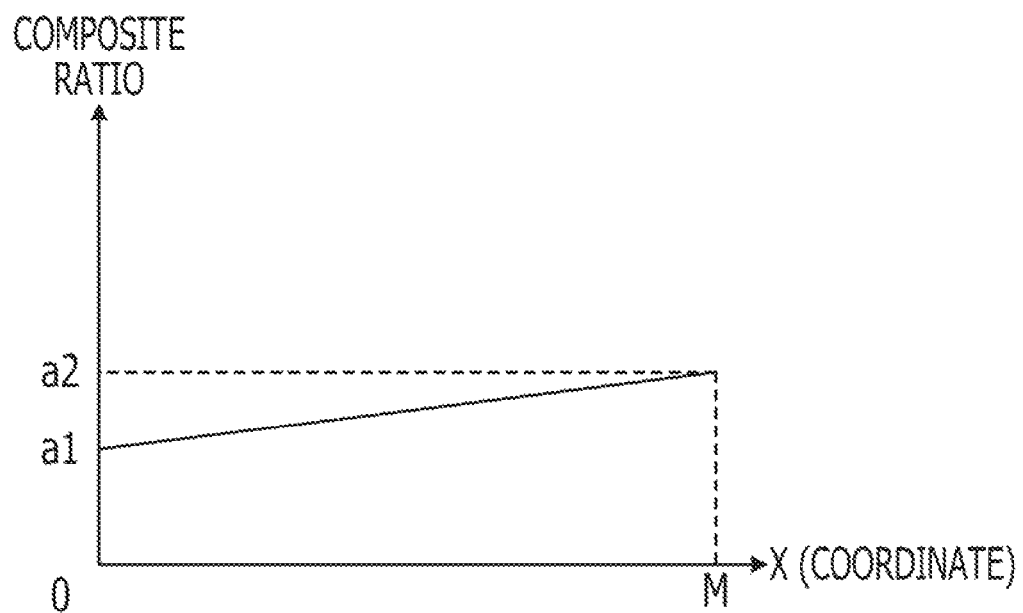
FIG. 10 illustrates how a composite ratio is calculated when a plurality of illuminances are input.

FIG. 10 illustrates how a composite ratio is calculated when a plurality of illuminances are input. The horizontal axis of the graph in FIG. 10 indicates X coordinates of pixel positions. The vertical axis of the graph in FIG. 10 indicates composite ratios. In the example of FIG. 10, a case is assumed in which an X coordinate of a left end of the screen when the display unit 11 is viewed from the front is 0 (substantially minimum value), and an X coordinate which is a right end of the screen is M (substantially maximum value). In the example of FIG. 10, the arithmetic unit 33 defines a composite ratio when the X coordinate is a substantially minimum value 0 as "a1", while the composite ratio when the X coordinate is a substantially maximum value M as "a2." The arithmetic unit 33 inputs an X coordinate of a pixel that is a subject for visibility correction to the linear function defined by the two points and thereby computes a composite ratio a' used for visibility correction of the pixel that has the X coordinate.

Returning to the explanation of FIG. 8, the correction unit 34 composes the input image X and the second high-frequency component Z by using the composite ratio "a" computed by the arithmetic unit 15. In the correction unit 18 in FIG. 3, a case is described in which substantially the same composite ratio "a" is used for all of the pixels, however, in the correction unit 34, different composite ratios are used for each of the pixels. In other words, the correction unit 34 uses the composite ratio a' that changes according to an X coordinate.

The correction unit 34 notifies an X coordinate of a pixel that is a subject for calculating a pixel value of a corrected image to the arithmetic unit 33. The correction unit 34 acquires a composite ratio a' from the arithmetic unit 33. The correction unit 34 multiplies a pixel value of an input image by a composite ratio (1-a') of the input image, and also multiplies a pixel value of the second high-frequency component by the composite ratio "a" of the second high-frequency component. The correction unit 34 adds the value obtained by multiplying the pixel value of the input image by the composite ratio (1-a') and the value obtained by multiplying the pixel value of the second high-frequency component by the composite ratio a'. The correction unit 34 obtains a corrected image by executing computation for all of the pixels of the input image X and the second high-frequency component.

Figure 11:
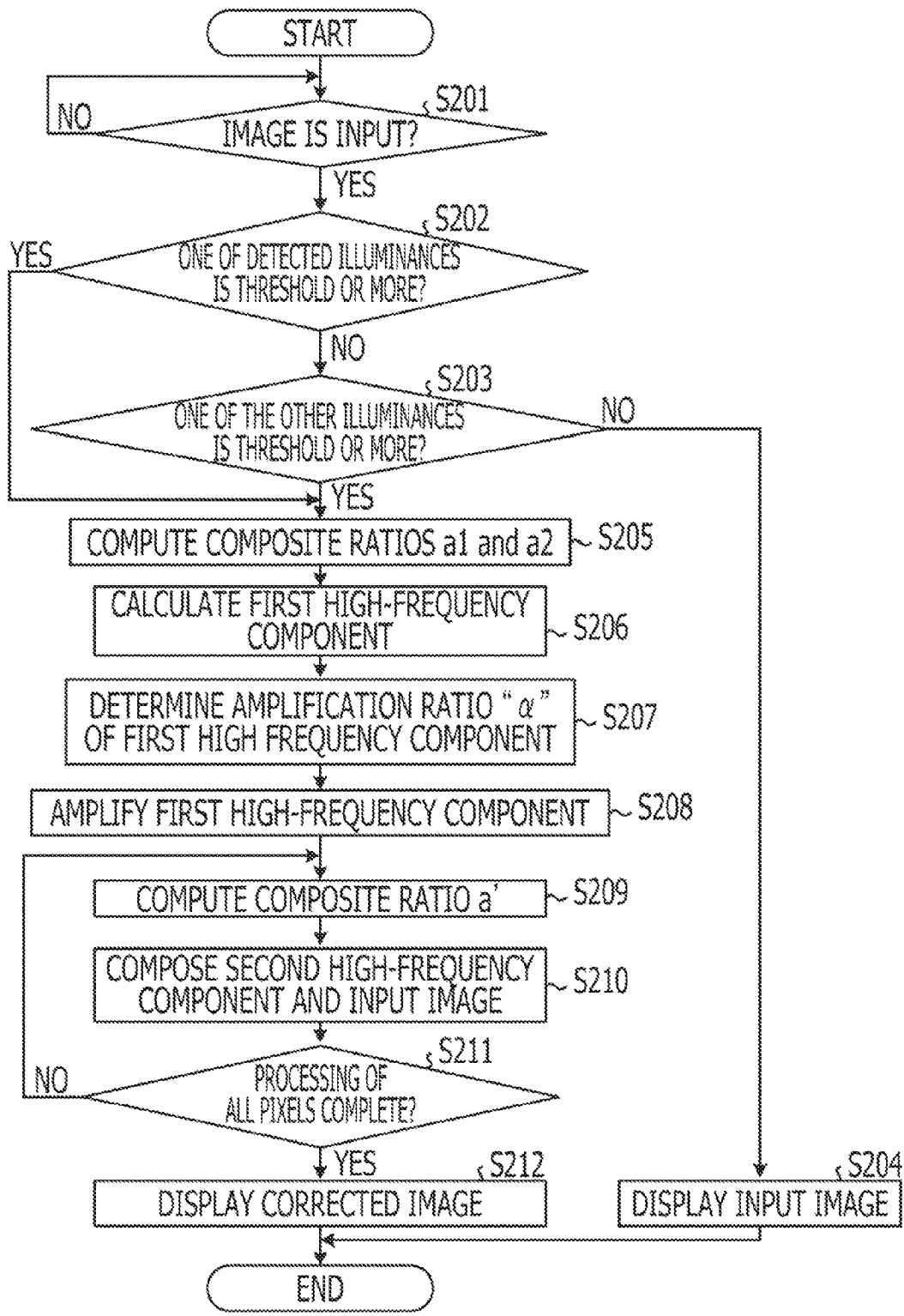
FIG. 11 is a flowchart illustrating processing procedures of image display according to the third embodiment.

The processing flow of the image processing apparatus according to the embodiment will be described. FIG. 11 is a flowchart illustrating processing procedures of image display according to the third embodiment. The image display processing is started when the reception unit 12 receives an input image while the image processing apparatus is turned ON.

As illustrated in FIG. 11, when the reception unit 12 receives an input image (Operation S201: Yes), the arithmetic unit 33 determines whether illuminance detected by the detection unit 31-1 is a threshold or more (Operation S202).

When the illuminance detected by the detection unit 31-1 is less than the threshold (Operation S202: No), the arithmetic unit 33 determines whether illuminance detected by the detection unit 31-2 is the threshold or more (Operation S203).

When the illuminance detected by the detection unit 31-2 is also less than the threshold (Operation S203: No), the controller 14 displays the input image on the display unit 11 (Operation S204), and completes the processing.

Meanwhile, when one of the illuminances detected by the detection unit 31-1 or the detection unit 31-2 is the threshold or more (Operation S202: Yes, or Operation S203: Yes), the arithmetic unit 33 computes a composite ratio "a1" and a composite ratio "a2" for each of the detection areas (Operation S205).

The extraction unit 16 calculates a low-frequency component Y by applying the low-pass filter 16a to the input image X. The extraction unit 16 calculates the first high-frequency component by extracting a difference between the input image X and the low-frequency component Y (Operation S206).

The extraction unit 16 calculates an amplification ratio "α" after applying tone correction to the first high-frequency component (Operation S207). The amplification unit 16c amplifies the first high-frequency component according to the amplification ratio "α" (Operation S208).

The correction unit 34 notifies an X coordinate of a pixel that is a subject for calculating a pixel value of a corrected image to the arithmetic unit 33, and thereby makes the arithmetic unit 33 compute a composite ratio a' of the X coordinate (Operation S209).

The correction unit 34 calculates a pixel value of the corrected image by composing pixel values of the input image X and the second high-frequency component Z based on the composite ratio a' that is acquired from the arithmetic unit 33 (Operation S210).

The processing of the above described operations S209 to S211 are repeated until the processing of pixel values of all of the pixels in the corrected image completes (Operation S211: No). When processing of pixel values of all of the pixels in the corrected image completes (Operation S211: Yes), the controller 14 displays the image corrected by the correction unit 18 on the display unit 11 (Operation S212), and completes the processing.

As described above, in the image display apparatus 30 according to the embodiment, visibility of the display image may also be improved even when external light with high illuminance is irradiated to the display unit 11.

In the image display apparatus 30 according to the embodiment, a composite ratio a' of the second high-frequency component Z is computed by using illuminances that are acquired from the plurality of detection units, detection unit 31-1 and the detection unit 31-2. Thus, according to the image display apparatus 30 of the embodiment, the composite ratio a' may be computed for each of the detection areas of the detection units. Furthermore, according to the image display apparatus 30 of the embodiment, composite ratio a' between each of the detection areas may be linearly interpolated by using the composite ratio a' of each of the detection areas of detection units. Moreover, according to the image display apparatus 30 of the embodiment, even when illuminance of external light irradiated to the display unit 11 varies, the input image X and the second high-frequency component Z may be composed by following up the variations.

Fourth Embodiment

Hereinafter, an alternative embodiment other than the above-described embodiments will be explained.

Application Example

Figure 12:
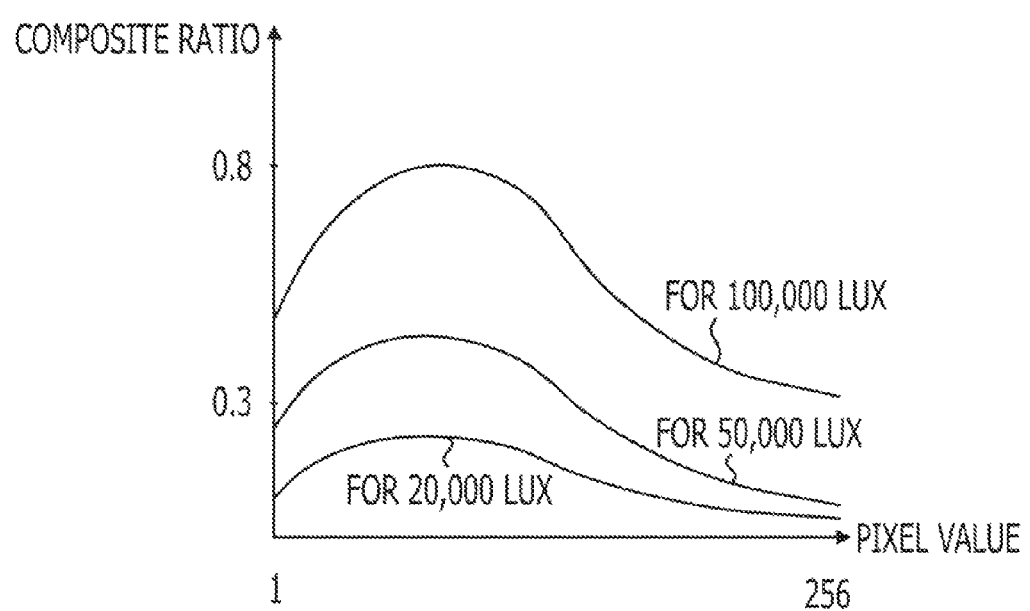
FIG. 12 illustrates an application example.

For example, the disclosed apparatus may derive a composite ratio of the second high-frequency component Z according to a size of a pixel value included in the input image X. FIG. 12 illustrates an application example. The horizontal axis of the graph in FIG. 12 indicates pixel values. The vertical axis of the graph in FIG. 12 indicates composite ratios. The example of FIG. 12 illustrates a waveform that is used for deriving a composite ratio when the illuminance is 20,000 Lux, that of when the illuminance is 50,000 Lux, and that of when the illuminance is 100,000 Lux. Storing waveforms for respective illuminances beforehand allows the arithmetic unit to identify a waveform to be used based on the illuminance detected by the detection unit. Moreover, the arithmetic unit derives a composite ratio that corresponds to a pixel value of the input image X based on the identified waveform.

As described above, by deriving the composite ratio of the second high-frequency component according to a size of a pixel value included in the input image X, for example, a composite ratio "a" around a substantially minimum value of a pixel value or that around a substantially maximum value may be smoothed. In other words, flexible correction may be achieved for visibility correction.

Moreover, the disclosed apparatus may be an image processing system that includes an image display apparatus with a display unit for displaying an image, and a server apparatus that is coupled to the image display apparatus. In other words, in the image processing system, the image processing unit 15 illustrated in FIG. 3, or the image processing unit 32 illustrated in FIG. 8 is assumed to be a server apparatus. The client terminal includes a display unit and a detection unit. The image processing system makes the server apparatus provide visibility correction service of image data. For example, the client device notifies illuminance acquired from a detection unit located around the display unit to the server apparatus. Meanwhile, the server apparatus derives a compression gain that is applied to a low-frequency component of the input image and an amplification gain that is applied to a high-frequency component of the input image by using the illuminance notified from the client terminal. The server apparatus generates an image to be displayed on the display unit of the client terminal based on the compression gain of the low-frequency component and the amplification gain of the high-frequency component, and transmits the generated image to be displayed to the client terminal.

Moreover, the disclosed apparatus may further include a derivation history storage unit that stores derivation history of composite ratios of the second high-frequency component Z. The disclosed apparatus determines whether or not calculated composite ratios a, a1, a2, and/or a' deviate beyond a specified range based on past calculation results. The calculation unit 2 may make the arithmetic unit 17 or the arithmetic unit 33 re-compute the composite ratios so that the composite ratios a, a1, a2, and/or a' are within the specified range. Accordingly, considerable variations between the previous input image and current input image may be reduced, if not prevented, and thereby reducing, if not preventing the viewer from feeling uncomfortable to the display image.

In the above-described first to third embodiments, cases are described in which typically visibility correction is applied without applying tone correction and saturation correction to input images, however, the tone correction and/or the saturation correction may be applied in combination with the visibility correction.

Application Example

In the above-described second and third embodiments, visibility correction in which the input image X and the second high-frequency component Z are composed are exemplified. However, the disclosed apparatus is not limited to the examples. In other words, the disclosed apparatus may be applied to overall technologies that change gains of a low-frequency component and a high-frequency component. For example, the disclosed apparatus may be similarly applied to an image quality improvement method that is called "Center/Surround Retinex" that models human visual characteristics.

In the above-described second and third embodiments, a composite ratio a and a composite ratio a' are calculated when the arithmetic unit 17 or the arithmetic unit 33 receives an illuminance from the detection unit, however, a table etc. that stores illuminance in association with a composite ratio may be retained in the image display apparatus 10 or the image display apparatus 30.

For example, illustrated components of each of the apparatuses may not be necessarily physically configured as illustrated. In other words, specific embodiments of distribution and integration of each of the apparatuses may not necessarily be as illustrated. All or part of the apparatuses may be functionally or physically distributed or integrated with any unit depending on various loads and usage status. For example, the image processing unit 15 or the image processing unit 32 may be coupled as external apparatus of the image display apparatus via a network. Functions of the above-described image processing apparatus or the image display apparatus may be achieved by providing the extraction unit 16, the arithmetic unit 17, or the correction unit 18 in different apparatuses respectively and coupling the apparatuses via a network so as to operate cooperatively.

Image Processing Program

Figure 13:
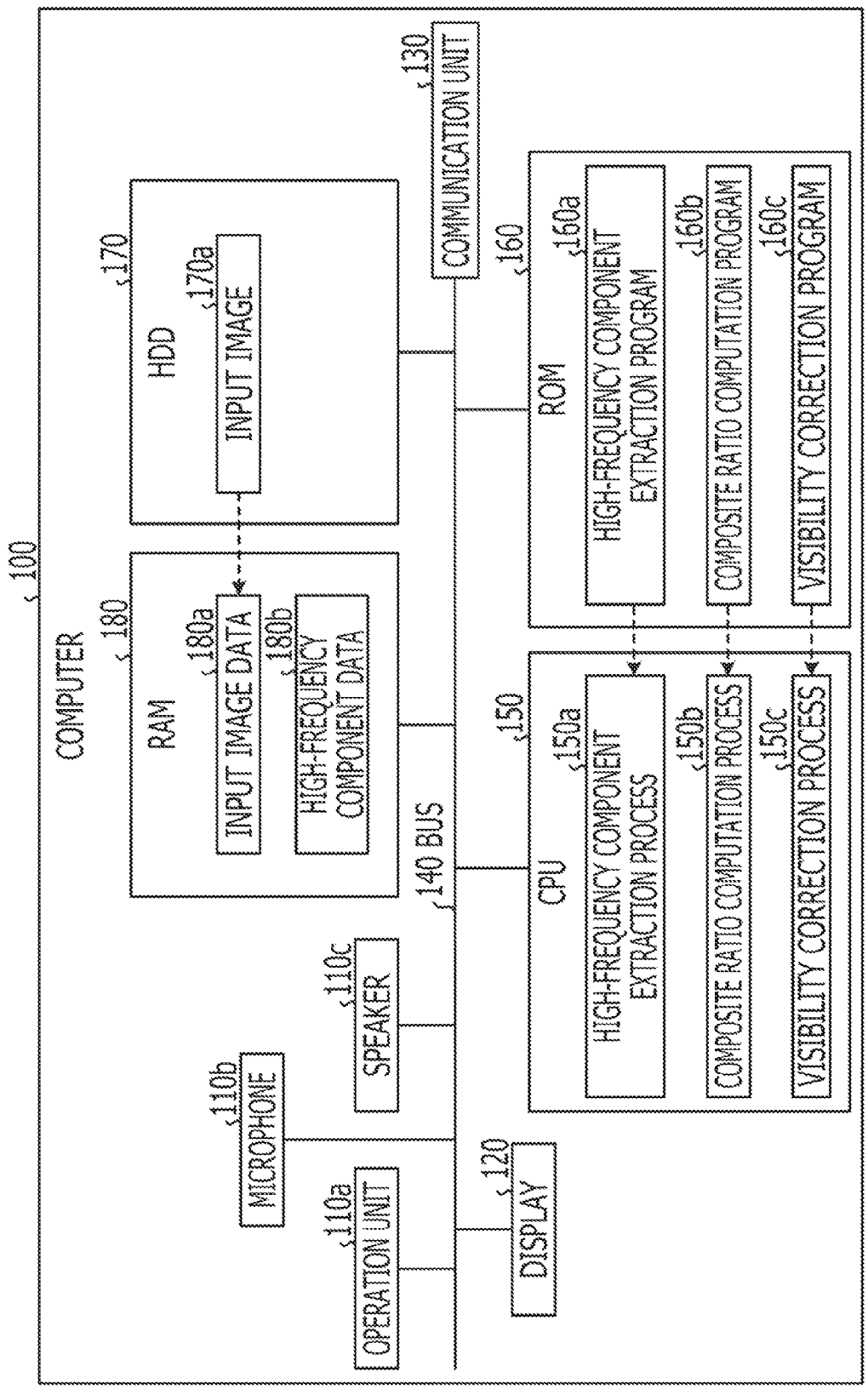
FIG. 13 illustrates an exemplary computer that executes an image processing program according to a fourth embodiment.

Various processing described in the above embodiments may be achieved by executing a prepared program by a computer such as a personal computer or a work station. Accordingly, hereunder, an exemplary computer will be described by referring to FIG. 13 that executes an image processing program providing substantially the same functions as those described in the above embodiments. FIG. 13 illustrates an exemplary computer that executes the image processing program according to the fourth embodiment.

As illustrated in FIG. 13, the computer 100 according to the fourth embodiment includes an operation unit 110a, a microphone 110b, a speaker 110c, a display 120, and a communication unit 130. Furthermore, the computer 100 includes a CPU 150, a Read Only Memory (ROM) 160, a Hard Disk Drive (HDD) 170, and a Random Access Memory (RAM) 180, and these components are coupled via a bus 140.

The ROM 160 stores a control program that exhibits substantially the same functions as the extraction unit 16, the arithmetic unit 17, and the correction unit 18 described in the second embodiment. In other words, the ROM 160 stores a high-frequency component extraction program 160a, a composite ratio computation program 160b, and a visibility correction program 160c as illustrated in FIG. 13. The programs 160a to 160c may be integrated or separated as appropriate as in the components of the image processing unit 15 illustrated in FIG. 3.

The CPU 150 reads the programs 160a to 160c from the ROM 160 and executes the programs 160a to 160c. Accordingly, the CPU 150 functions as the high-frequency component extraction process 150a, the composite ratio computation process 150b and the visibility correction process 150c as illustrated in FIG. 13 for the programs 160a to 160c respectively. Processes 150a to 150c corresponds to the extraction unit 16, the arithmetic unit 17, and the correction unit 18 illustrated in FIG. 3 respectively.

The HDD 170 is provided with an input image 170a. The CPU 150 reads the input image 170a and stores the input image 170a into the RAM 180. Moreover, the CPU 150 generates a high-frequency component data 180b by using the input image data 180a stored in the RAM 180. Furthermore, the CPU 150 executes the image processing program by generating a corrected image using the input image data 180a and the high-frequency component data 180b.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. An image processing apparatus comprising:
a display; and
a processor configured to execute a plurality of instructions, the instructions comprising,
a calculation instruction configured to calculate, based on an illuminance irradiated on the display, a compression gain that is applied to a low-frequency component of an input image and an amplification gain that is applied to a high-frequency component of the input image;
a generation instruction configured to generate a display image in which a pixel value of a pixel of the input image is corrected based on the compression gain and the amplification gain calculated by the calculation instruction; and
a display instruction configured to display the display image for the display.

2. The image processing apparatus according to claim 1, wherein the calculation instruction calculates the compression gain and the amplification gain according to a size of the pixel value.

3. The image processing apparatus according to claim 1, wherein the calculation instruction calculates an amplification ratio that amplifies the high-frequency component based on distribution of the high-frequency component in the input image and calculates the compression gain and the amplification gain based on the amplification ratio and an illuminance irradiated on the display.

4. The image processing apparatus according to claim 3, wherein the generation instruction calculates a first multiplied value by multiplying the low-frequency component by the compression gain and a second multiplied value by multiplying the high-frequency component by the amplification gain, and corrects the pixel value based on an added value obtained by adding the first multiplied value and the second multiplied value.

5. The image processing apparatus according to claim 1, wherein the calculation instruction calculates a plurality of the compression gains and the amplification gains according to each of a plurality of illuminances acquired from each of a plurality of detection instructions.

6. The image processing apparatus according to claim 5, wherein the plurality of illuminances correspond to a plurality of areas of the display and the calculation instruction calculates the plurality of the compression gains and the amplification gains that are applied to the display image displayed on each of the plurality of areas.

7. The image processing apparatus according to claim 1, wherein the calculation instruction determines whether at least one of the compression gain and the amplification gain is in a specified range based on previously derived compression gains and amplification gains, and when at least one of the compression gain and the amplification gain is out of the specified range, sets the compression gain and the amplification gain to values within the specified range.

8. A non-transitory storage medium to store an image processing program that causes a computer to execute operations, the operations comprising:
acquiring an illuminance from a detection that detects illuminance irradiated on a display unit;
calculating a compression gain that is applied to a low-frequency component of an input image and an amplification gain that is applied to a high-frequency component of the input image based on the acquired illuminance; and
generating a display image by correcting a pixel value of a pixel of the input image based on the calculated compression gain and amplification gain.

9. The non-transitory storage medium according to claim 8, wherein the calculating calculates the compression gain and the amplification gain according to a size of the pixel value.

10. The non-transitory storage medium according to claim 8, wherein the calculating calculates an amplification ratio that amplifies the high-frequency component based on distribution of the high-frequency component in the input image and calculates the compression gain and the amplification gain based on the illuminance and the amplification ratio.

11. The non-transitory storage medium according to claim 10, wherein the generating calculates a first multiplied value by multiplying the low-frequency component by the compression gain, and a second multiplied value by multiplying the high-frequency component by the amplification gain, and corrects the pixel value based on an added value obtained by adding the first multiplied value and the second multiplied value.

12. The non-transitory storage medium according to claim 8, wherein the calculating calculates a plurality of the compression gains and the amplification gains according to each of a plurality of illuminances acquired from each of a plurality of detection.

13. The non-transitory storage medium according to claim 12, wherein the plurality of illuminances correspond to a plurality of areas of the display and calculates a plurality of the compression gains and the amplification gains that are applied to the display image displayed on each of the plurality of areas.

14. The non-transitory storage medium according to claim 8, wherein the calculating determines whether at least one of the compression gain and the amplification gain is in a specified range based on previously derived compression gains and amplification gains, and when at least one of the compression gain and the amplification gain is out of within the specified range, sets the compression gain and the amplification gain to values within the specified range.

15. An image processing method executed by a computer comprising:
acquiring an illuminance from a detection that detects illuminance irradiated on a display unit;
calculating a compression gain that is applied to a low-frequency component of an input image and an amplification gain that is applied to a high-frequency component of the input image based on the acquired illuminance; and
generating a display image by correcting a pixel value of a pixel of the input image based on the calculated compression gain and amplification gain.

16. The image processing method according to claim 15, wherein the calculating calculates the compression gain and the amplification gain according to a size of the pixel value.

17. The image processing method according to claim 15, wherein the calculating calculates an amplification ratio that amplifies the high-frequency component based on distribution of the high-frequency component in the input image and calculates the compression gain and the amplification gain based on the illuminance and the amplification ratio.

18. The image processing method according to claim 17, wherein the generating calculates a first multiplied value by multiplying the low-frequency component by the compression gain, and a second multiplied value by multiplying the high-frequency component by the amplification gain, and corrects the pixel value based on an added value obtained by adding the first multiplied value and the second multiplied value.

19. The image processing method according to claim 15, wherein the calculating calculates a plurality of the compression gains and the amplification gains according to each of a plurality of illuminances acquired from each of a plurality of detection units.

20. The image processing method according to claim 19, wherein the plurality of illuminances correspond to a plurality of areas of the display unit and calculates a plurality of the compression gains and the amplification gains that are applied to the display image displayed on each of the plurality of areas.

* * * * *